(12) United States Patent
Okada et al.

(10) Patent No.: US 6,704,482 B2
(45) Date of Patent: Mar. 9, 2004

(54) OPTICAL CABLE

(75) Inventors: Naoki Okada, Sakura (JP); Yoshio Hashimoto, Sakura (JP); Masayoshi Yamanaka, Sakura (JP); Michio Suematsu, Sakura (JP); Matsuhiro Miyamoto, Sakura (JP); Yoshiyasu Satoh, Sakura (JP)

(73) Assignee: Fujikura Ltd., Tokyo (JP)

( * ) Notice: Subject to any disclaimer, the term of this patent is extended or adjusted under 35 U.S.C. 154(b) by 22 days.

(21) Appl. No.: 10/109,098

(22) Filed: Mar. 27, 2002

(65) Prior Publication Data

US 2002/0141713 A1 Oct. 3, 2002

(30) Foreign Application Priority Data

| Mar. 29, 2001 | (JP) | ........................................ | 2001-097204 |
| Apr. 5, 2001  | (JP) | ........................................ | 2001-107554 |
| May 2, 2001   | (JP) | ........................................ | 2001-135080 |
| May 9, 2001   | (JP) | ........................................ | 2001-138994 |

(51) Int. Cl.$^7$ ................................................ G02B 6/44
(52) U.S. Cl. ........................ 385/113; 385/111; 385/114
(58) Field of Search ........................ 385/111–114, 109, 385/110

(56) References Cited

U.S. PATENT DOCUMENTS

| 4,744,631 | A |   | 5/1988  | Eichenbaum et al. .... 350/96.23 |
| 5,416,875 | A | * | 5/1995  | Keplinger et al. ........... 385/102 |
| 5,509,097 | A | * | 4/1996  | Tondi-Resta et al. ....... 385/113 |
| 5,621,842 | A |   | 4/1997  | Keller ......................... 385/114 |
| 6,122,424 | A |   | 9/2000  | Bringuier .................... 385/100 |
| 6,236,790 | B1| * | 5/2001  | Okada et al. ................ 385/102 |
| 6,466,720 | B1| * | 10/2002 | Fishlock et al. ............. 385/112 |

FOREIGN PATENT DOCUMENTS

| EP | 1085359   | 3/2001  | ............ G02B/6/44 |
| JP | 63-301911 | 12/1988 | ............ G02B/6/44 |
| JP | 2-083507  | 3/1990  | ............ G02B/6/44 |
| JP | 3-172808  | 7/1991  | ............ G02B/6/44 |
| JP | 4-143710  | 5/1992  | ............ G02B/6/44 |
| JP | 4-182611  | 6/1992  | ............ G02B/6/44 |
| JP | 8-240752  | 9/1996  | ............ G02B/6/44 |

* cited by examiner

Primary Examiner—Michael C. Zarroli
(74) Attorney, Agent, or Firm—Darby & Darby

(57) ABSTRACT

An optical cable formed by optical fibers, a forming pipe, a sheath, a pair of tension members, and a pair of rip cords. The forming pipe includes a plurality of tapes arranged to permit the forming pipe to be divided in the longitudinal direction and the rip cords are located near the seams of the forming pipe. A distance from the surface of the tension members to the inner surface of the sheath and to the outer surface of the sheath are both 0.3 mm or more. A distance from the center of the rip cords to the inner surface of the sheath is from 0.2-fold or greater to 1.2-fold or less than the radius of the tip cords. Furthermore, the distance from the surface of the rip cords to the seams of the forming pipes is 0.5 mm or less.

10 Claims, 10 Drawing Sheets

PRIOR ART FIG. 15
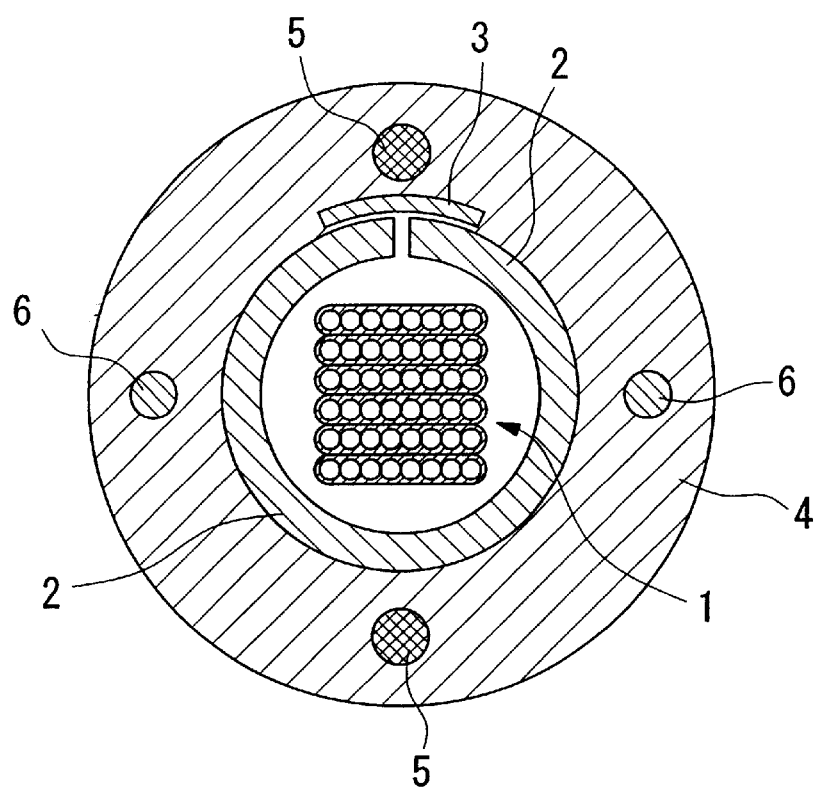

OPTICAL CABLE

BACKGROUND OF THE INVENTION

1. Field of the Invention

The present invention relates to an optical cable, which is formed by laminating together a plurality of optical fiber tape cores, in which multiple optical fiber cores are arrayed in the form of a tape, and housing this laminate inside a sheath; a device for manufacturing this optical cable; and an optical cable production method which employs this manufacturing device.

2. Background Art

Optical cables in which an optical tape core laminate, obtained by arraying multiple optical fiber cores in the form of a tape and laminating a plurality of these optical fiber tape cores together, is housed inside a pipe-shaped sheath, have been disclosed in (1) U.S. Pat. No. 4,744,631, (2) U.S. Pat. No. 5,621,842, and (3) U.S. Pat. No. 6,122,424.

The sheath in these optical cables has been filled with a jelly-like water-repelling blended material or a filling material having elastic properties. An optical cable has also been disclosed in (4) EP 1,085,359A2 in which an optical tape core laminate, that is protected by a protective tape, is covered by a sheath.

In addition, optical cables have been disclosed in (5) Japanese Patent Application, First Publication No. 3-172808, (6) Japanese Patent Application, First Publication No. 4-143710, and (7) Japanese Patent Application, First Publication No. 8-240752, which employ a spacer in which at least one or more spiral grooves (referred to as "slots" hereinafter) are formed in the surface of a long cylindrical rod consisting of a plastic material, and the optical tape core laminate is housed inside this slot. Further, (8) Japanese Patent Application, First Publication No. 2-83507 discloses an optical cable in which an optical fiber tape core laminate is housed inside spiral grooves in a spacer in which the spiral grooves reverse directions alternating from the left to the right, i.e., alternately reverse in the SZ directions, at a fixed cycle on the surface of a cylindrically shaped rod. (9) Japanese Patent Application, First Publication No. 4-182611 discloses an optical cable in which a plurality of optical fiber tape cores are laminated inside a pliable housing member (uni-slot tube) which is shaped in the form of the letter "U" in cross-section, and this pliable housing member is twisted in the SZ directions around a tension member.

However, the optical cables disclosed in patent applications (1)–(3) above employ a relatively large amount of filling material to fill the sheath, so that a spacer for this filling material is needed. Thus, a thicker cable diameter and a heavier cable weight result.

The optical cable disclosed in patent application (4) requires the step of wrapping protective tape around the optical tape core laminate, while the optical cables disclosed in patent applications (5) through (9) require the step of forming the slot in the surface of the cylindrical rod. As a result, a greater number of manufacturing steps are required to produce the optical cable, and there are also disadvantages in terms of costs. Moreover, in the optical cables disclosed in patent applications (5) through (9), distortion in the optical fiber core increases when the optical fiber tape core is mounted inside the slot, so that a cable with excellent properties is not obtained.

In addition, given the size of the distortion that occurs in an optical fiber core housed inside spiral grooves formed in a spacer which reverse from the S direction to the Z direction, and from the Z direction to the S direction, when the optical cable housing this optical fiber core is bent, (10) Japanese Patent Application, (Granted) Publication No. 7-13687 suggests that it is preferable that the track of the spiral grooves be in the form of a sine wave, and the angle of reversing be in the range of 230° to 330°, i.e., the spiral grooves reverse at every 230° to 330° rotation, with 275° providing the smallest distortion in the optical fiber core.

However, to form a spiral groove of this shape requires highly controlled techniques. Moreover, the technique disclosed in (10) is directed to optical cables in which the number of optical fiber cores is in the range of 3000~4000, or more.

On the other hand, an optical cable having a structure like that shown in FIG. 15 has been proposed recently.

In FIG. 15, numeral 1 indicates an optical tape core laminate in which multiple layers of optical fiber tape cores have been laminated together. This optical tape core laminate 1 is not fixed completely in place inside a forming pipe 2, but rather is housed with an interval of spacing between itself and the forming pipe 2. This forming pipe 2 is formed into the shape of a pipe by employing a pipe-forming method in which tape, consisting of a rigid plastic film like polyester, polypropylene, polyethylene, polyamide, or fiber reinforced plastic (FRP), is continuously fashioned into the shape of a pipe. The seams running along the longitudinal direction of this forming pipe 2 are then joined together by meaning of adhesive tape 3.

The Forming pipe 2 is covered with a sheath 4 consisting of polyethylene or plasticizing polyvinyl chloride or the like. The formation of the sheath 4 is carried out using the usual extruding and cladding method.

Two tension members 5, consisting of fiber-reinforced plastic or steel, brass or other such metal wire, and two rip cords 6, consisting of plastic cords, are embedded in the sheath 4. The tension members 5 are disposed opposite one another with the optical tape core laminate 1 interposed between them. The rip cords 6 are disposed opposite one another with the optical tape core laminate 1 interposed between them, and so as to be perpendicular to a line joining the two tension members 5.

In order to support and house the optical tape core laminate 1 within the forming pipe 2 without completely fixing it in place inside the pipe 2, an intermittent filling material (not shown) consisting of a soft hot-melt adhesive is employed to fill the optical cable at intermittent points along its length.

When subsequently splitting an optical cable of this design, the sheath 4 is cut open by pulling the both rip cords 6, thereby dividing the optical cable into two parts. However, it can be difficult to split the forming pipe 2 due to its high resistance to tearing, or because it adheres to the sheath 4, for example. Thus, it can take some time to expose the optical tape core laminate 1 inside. In other words, this optical cable does not always demonstrate excellent properties with respect to subsequent splitting.

SUMMARY OF THE INVENTION

The present invention was designed to resolve the problems described above, and has as its objective to provide an optical cable employing optical fiber tape cores which does not need a large amount of filling material or a long cylindrical spacer in which spiral grooves are formed. Furthermore, it is the objective of the present invention to provide an optical cable with relatively few cores which has excellent cable properties even when the optical tape core laminates are twisted in an SZ arrangement and the optical cable is bent. In addition, it is the objective of the present invention to simply and efficiently provide an optical cable which is superior with respect to ease of subsequent splitting of the cable.

An optical cable according to the present invention is provided with optical fibers, a forming pipe for housing the optical fibers, a sheath provided around the forming pipe, a pair of tension members embedded in the sheath, and a pair of rip cords similarly embedded inside the sheath, and is further characterized as follows. Namely, this forming pipe is fashioned using a plurality of tapes in such a way as to be divisible along its longitudinal direction. The rip cords are provided near the seams of this forming pipe, and the distance from the surface of the tension members to the sheath's inner surface and to the sheath's outer surface are both 0.3 mm or more. The distance from the center of the rip cords to the inner surface of the sheath is from 0.2-fold or greater to 1.2-fold or less than the radius of the rip cords. The distance from the surface of the rip cords to the seams of the forming pipes is 0.5 mm or less.

An optical cable according to the present invention is provided with optical fibers, a forming pipe for housing the optical fibers, a sheath provided around the forming pipe, and a pair of rip cords similarly embedded inside the sheath, and is further characterized as follows. Namely, this forming pipe is fashioned using a plurality of tapes in such a way as to be divisible along its longitudinal direction, and both ends of each of the plurality of tapes are bent toward the outside.

In this case, indicators showing the position of the ends of the plurality of tapes may be formed on the outer periphery of the sheath, and the rip cords may be provided near the seams of this forming pipe.

An optical cable according to the present invention is characterized in the provision of a cable core in which a plurality of optical fiber cores are arrayed in the form of a tape and the optical tape core laminate obtained by laminating this plurality of optical fiber tape cores is twisted in one direction or in the SZ directions; a protective tape which covers the periphery of the cable core with an interval of spacing therebetween and is not twisted (however, the cable core which is not twisted and is held in the protective tape at random when two cores type optical fiber ribbons, optical fibers, or optical fiber cores are used); a sheath which is provided around the protective tape; tension members which are embedded in the sheath; and rip cords which are similarly embedded in the sheath and are disposed near the seams of the protective tape.

In this case, the protective tape is composed of a pair of protective tape pieces, and respective rip cords are disposed near the seams of these protective tape pieces.

It is preferable that the tension members be disposed at a position which is somewhat separated from the protective tape.

The protective tapes are provided with a base and a hot-melt coating layer which is provided to the outer surface of this base. This hot-melt coating layer may be melted onto the sheath.

A water-absorbing layer may be provided to the inner surface of the protective tape's base.

An optical cable according to the present invention is characterized in the provision of an optical tape core laminate in which a plurality of optical fiber cores are arrayed in the form of a tape and these optical fiber tape cores are laminated together; a cable core having a protective tape covering its periphery; a sheath which is provided around the cable core; and a pair of tension members which are embedded roughly opposite one another centered around the cable core. This optical cable is further characterized in that the cable core is twisted so as to alternately reverse from the left to the right at a fixed cycle, and the position at which the cable core reverses in one direction and the position at which the cable core reverses in the other direction are opposite one another and on either side of the surface which includes the pair of tension members.

In this case, it is also acceptable, in addition to the tension members to embed the rip cords inside the sheath.

The optical cable according to the present invention can be formed using a manufacturing device provided with a cylindrical inner pipe; a cylindrical nipple which is disposed outside this inner pipe with a first spacing interval therebetween, and in which tension member insertion holes and rip cord insertion holes have been formed; and a die which is disposed outside this nipple with a second spacing interval therebetween; by employing a method in which a plurality of plastic tapes are sent into this first spacing interval and are shaped into a pipe to make a forming pipe, an optical unit relayed from inside the inner pipe is housed inside this forming pipe, the tension members and the rip cords are relayed from the tension member insertion holes and the rip cord insertion holes respectively, and melted resin to form the sheath is supplied from the second spacing interval.

In this case, a plurality of projections for determining positioning may be provided to the first spacing interval in the above-described manufacturing device, and the plurality of plastic tapes can be relayed while being guided inside the first spacing interval using these various positioning projections.

BRIEF DESCRIPTION OF THE DRAWINGS

FIG. 15 is a cross-sectional view showing a conventional optical cable.

PREFERRED EMBODIMENTS OF THE PRESENT INVENTION

Preferred embodiments of the present invention will now be explained in detail using the accompanying figures. Note that parts which have the same structure or function as in the conventional optical cable shown in FIG. 15 will be assigned the same numeric symbol and an explanation thereof will be omitted.

Figure 1:
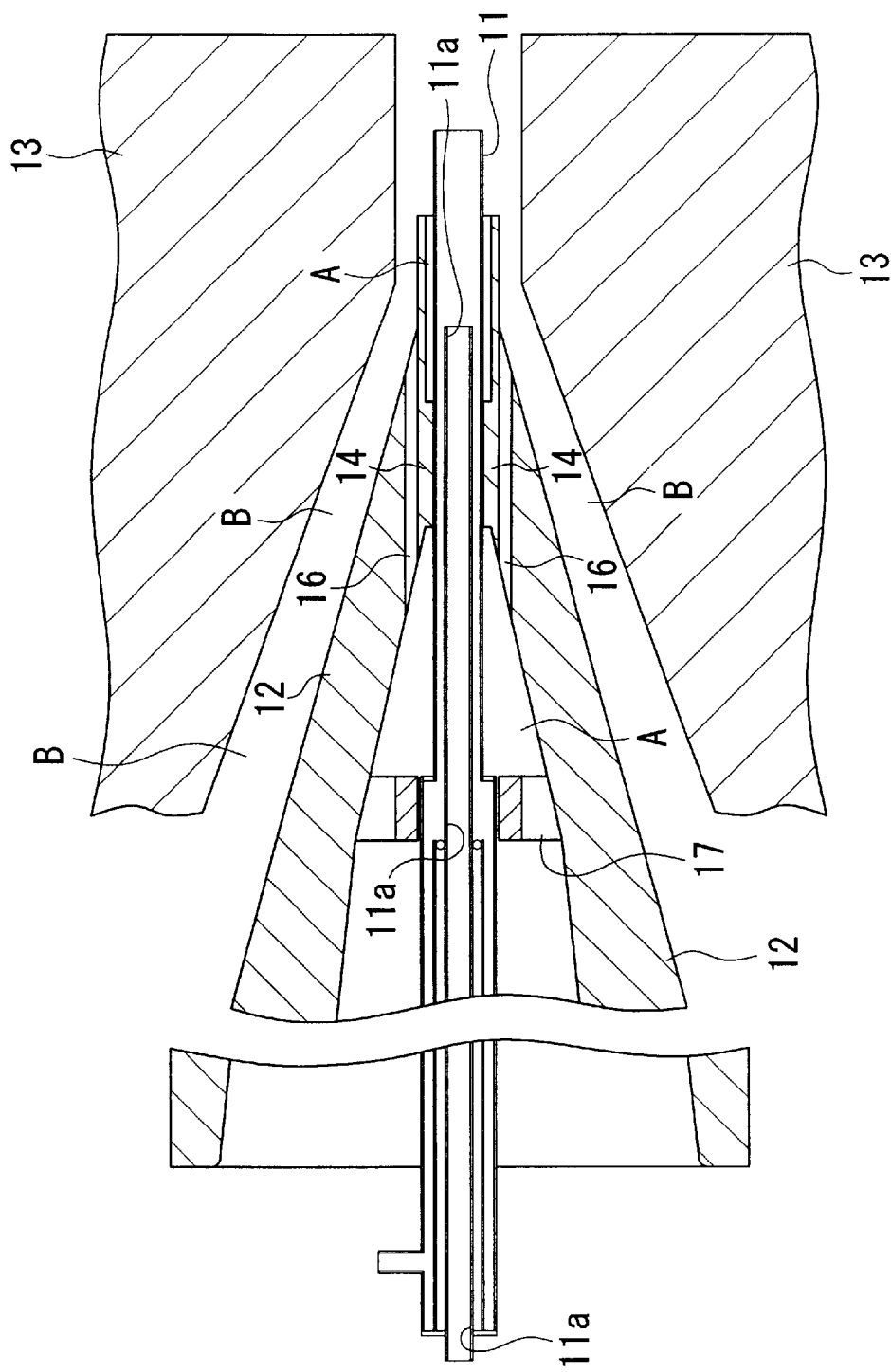
FIG. 1 is a cross-sectional view showing an example of the device for manufacturing an optical cable according to the present invention.
Figure 2:
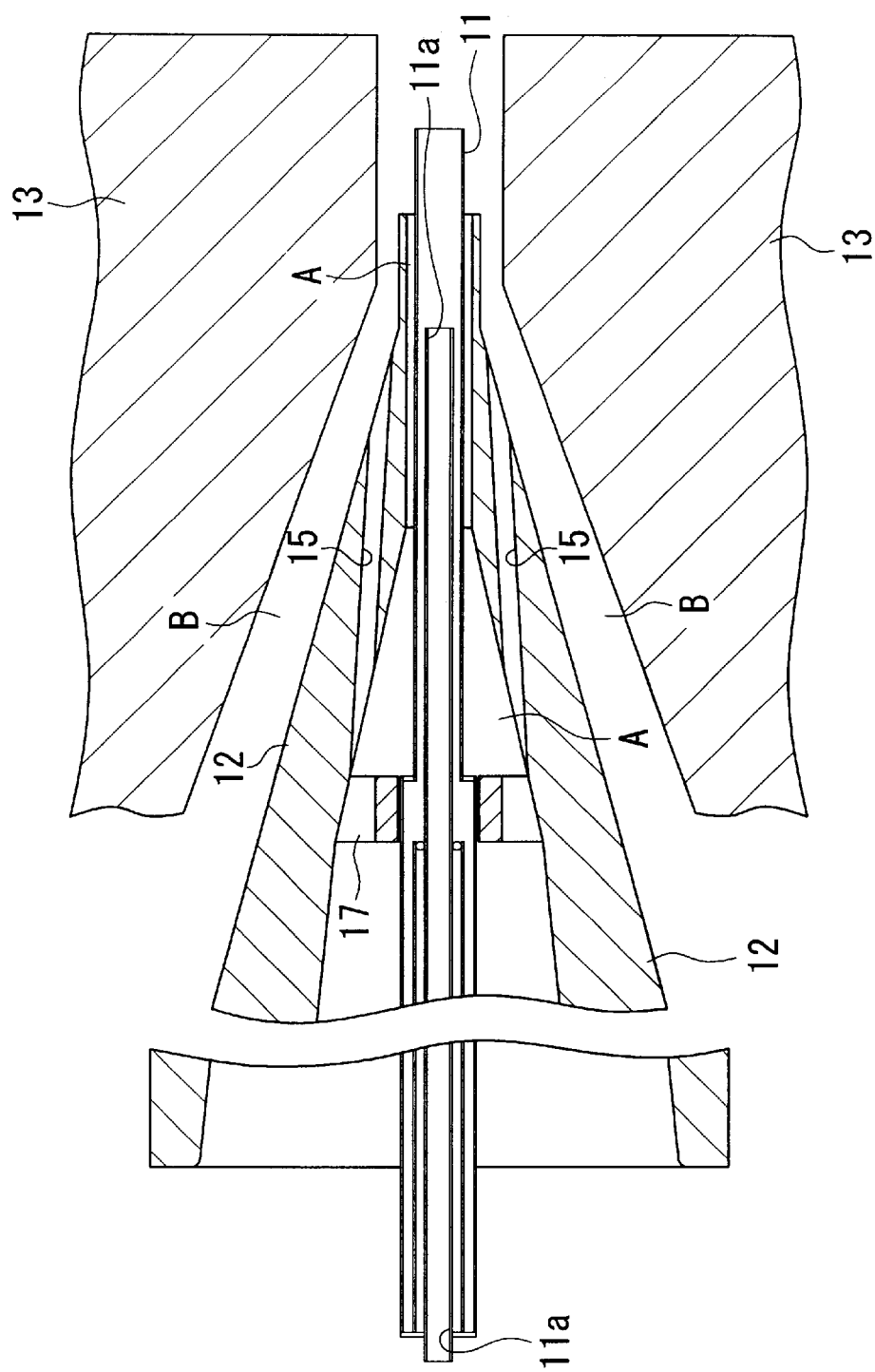
FIG. 2 is a cross-sectional view showing an example of the device for manufacturing an optical cable according to the present invention.
Figure 3:
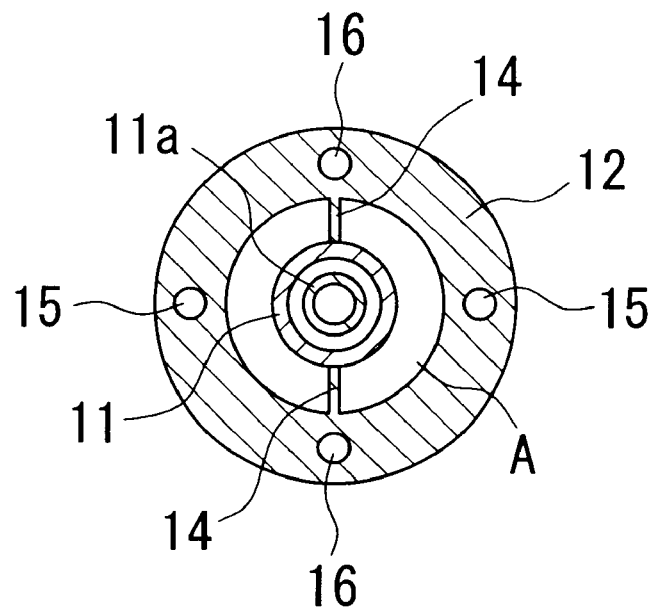
FIG. 3 is a cross-sectional view showing an enlargement of the essential components in one example of the device for manufacturing an optical cable according to the present invention.

FIGS. 1 through 4 show an example of the optical cable manufacturing device according to the present invention. In these figures, 11 is an inner pipe, 12 is a nipple, and 13 is a die. As shown in FIGS. 1 and 2, the inner pipe 11 is a metallic pipe which is cylindrical in shape. As will be explained below, the inner pipe 11 supports plastic tapes 2a on its inner surface and forms it into a cylindrical shape along with the nipple 12.

A straight optical unit inserting pipe 11a is inserted inside the inner pipe 11 with a slight interval of spacing present between the pipes. The front end of this optical unit inserting pipe 11a is designed to open slightly caudally to the open end of the inner pipe 11, and so that an optical tape core laminate 1, which serves as the optical unit, can be inserted from the rear end of the optical unit inserting pipe 11a toward the inner pipe 11.

The inner pipe 11 is attached inside nipple 12 using a support member (not shown) so as to have the same axis with a fixed interval of spacing (first space interval) A between the inner pipe 11 and nipple 12. The nipple 12 is cylindrical in shape. The rear portion of the nipple 12 has a thicker diameter and forms a wrapper. Further, as shown in enlargement in FIG. 3, a rib-shaped positioning projection 14 is provided extending along the longitudinal direction of the nipple 12 on the inner wall surface of the nipple 12. Two of these positioning projections 14 are disposed at positions that divide the inner wall surface of the nipple 12 equally.

Two tension member inserting holes 15 and two rip cord inserting holes 16 are punched through the wall of the nipple 12, and tension members 5 and rip cords 6 are relayed through these holes, respectively.

The tension member inserting holes 15 are disposed so as to be symmetrical about a central axis through the nipple 12. The rip cord inserting holes 16 are disposed perpendicular to a line joining the tension inserting holes 15 and so as to be symmetrical about a central axis through the nipple 12. The rip cord inserting holes 16 and positioning projections 14 are positioned at approximately the same position along the circumferential direction of the nipple 12.

Two plastic tapes 2a are guided by the positioning projections 14 into the first spacing interval A between the inner pipe 11 and nipple 12. These plastic tapes 2a are formed in the shape of a pipe in which both edges come into contact with one another as plastic tape 2a advances forward, and are designed so as to obtain a forming pipe 2 which can be divided into two parts.

The die 13 forms a spacing interval in the shape of a truncated cone and a spacing interval in the shape of a cylinder continuing off the end this truncated cone inside a cylindrically shaped block. The nipple 12 is attached via a support member (not shown) to the space inside the die 13 so as to have the same axis with a fixed interval of space (second spacing interval) B provided between the nipple 12 and die 13.

The die 13 is fixed in place inside the cross-head die of an extruder. The second spacing interval B between the nipple 12 and die 13 communicates with the melted resin expelling opening in the extruder. As a result, melted resin flows into the second spacing interval B.

Figure 4:
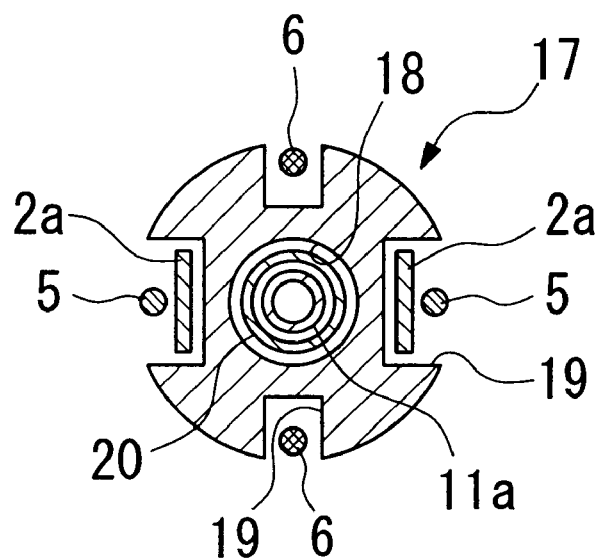
FIG. 4 is a cross-sectional view showing an enlargement of the essential components in one example of the device for manufacturing an optical cable according to the present invention.

A holding member 17 is pushed in from the back and fixed in place on the rear portion of the tapered inner surface of the nipple 12. As shown in FIG. 4, the holding member 17 is in the form of a disk, with a circular penetrating hole 18 formed through the center. The optical unit insertion pipe 11a and a hot-melt resin supplying duplex pipe 20 pass through this penetrating hole 18.

Four square cut-outs 19 are formed in the outer periphery of the holding member 17. The rip cords 6 are inserted from the rear and directed forward in one pair of oppositely disposed the cut-outs 19. The tension members 5 and plastic tapes 2a are respectively inserted from the rear and directed forward in the remaining pair of oppositely disposed cutouts 19. The tension members 5 are positioned to be the outside and the plastic tapes 2a are positioned to be on the inside in these cut-outs 19.

The inner pipe 11, optical unit insertion pipe 11a, nipple 12 and die 13 form one structure that is fixed inside the cross-head die of an extruder. The rear ends of the optical unit insertion pipe 11a and nipple 12 are open to the outside at the rear end of cross-head die. Further, the relative positioning of these three members is determined so that the front end of the inner pipe 11 is positioned slightly more to the rear than the front end of the nipple 12, and the front end of the nipple 12 is positioned slightly more to the rear than the front end of the die 13.

The hot-melt resin supplying duplex pipe 20 is provided to the outer periphery of the optical unit insertion pipe 11a. Hot-melt resin is supplied and intermittently expelled in the melted state to the open end at the front of the optical unit insertion pipe 11a. This hot-melt resin supplying duplex pipe 20 is inserted into the penetrating hole 18 in the supporting member 17 along with the optical unit insertion pipe 11a.

Next, the method for producing an optical cable employing this manufacturing device will be explained. First, the optical tape core laminate 1, which serves as the optical unit, is continuously relayed from the rear end of the optical unit insertion pipe 11a, and is supplied into the inner pipe 11. Two plastic tapes 2a are continuously supplied into the first spacing interval A. Two tension members 5 and two rip cords 6 are continuously supplied into the tension member insertion holes 15 and rip cord insertion holes 16, respectively, in the nipple 12. At the same time, melted resin for forming a sheath 4 consisting of polyethylene, plasticizing polyvinyl chloride or the like is supplied from the extruder into the second spacing interval B.

As a result, the two plastic tapes 2a are bent into a semi-circle by the inner pipe 11 and nipple 12 while being positioned by the respective positioning projections 14. Both edges of the two plastic tapes 2a come in contact with one another to form a single forming pipe 2, with being housed inside the optical tape core laminate 1.

At the same time, melted resin which is supplied into the second spacing interval B flows around the outside of the forming pipe 2 and the sheath 4 is formed for covering the forming pipe 2. The tension members 5 and rip cords 6 are embedded in this melted resin.

Along with this action, melted hot-melt resin is intermittently expelled into the inner pipe 11 from the open end of the hot-melt resin supplying duplex pipe 20. As a result, the hot-melt resin intermittently adheres along the longitudinal direction of the optical tape core laminate 1, and intermittently affixes the optical tape core laminate 1 inside the forming pipe 2.

Figure 5A:
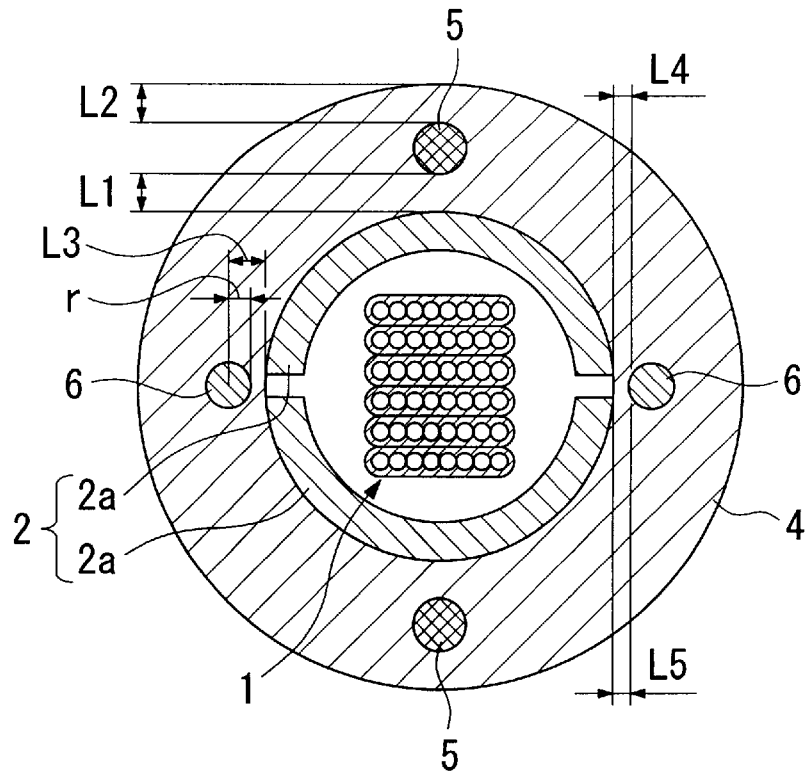
FIG. 5A is a cross-sectional view showing an example of an optical cable according to the present invention.

As a result of this operation, an optical cable having a structure such as shown in FIG. 5A is continuously extruded from cross-head die, cooled by a cooling device, and wound.

By means of the present invention's manufacturing method, an optical cable having a design such as shown in FIG. 5A can be produced easily, efficiently and at low cost, continuously and at a single stroke.

The optical cable shown in FIG. 5A differs from the conventional optical cable shown in FIG. 15 in that the forming pipe 2 can be divided in half along the longitudinal direction, an adhesive tape 3 is not present, and the rip cords 6 are disposed inside the sheath 4 near the seams of this dividable forming pipe 2.

When subsequently splitting an optical cable of this design, the rip cords 6 are pulled to tear open the sheath 4. As a result, the forming pipe 2, which was already divided into two pieces, is split with each part remaining adhered to the respective portions of the sheath 4. As a result, the division of the sheath 4 and forming pipe 2 is carried out in a single stroke, and the optical tape core laminate 1 inside the forming pipe 2 can be exposed quickly and easily. Moreover, since the adhesive tape employed in convention optical cables is not necessary, fabrication of the optical cable is simplified and production costs are reduced.

Note that in the optical cable shown in FIG. 5A, distance L1 from the surface of the tension member 5 to the inner surface of the sheath 4 inner surface, and distance L2 from the surface of the tension member 5 to the outer surface of the sheath 4, are each set to be 0.3 mm or more. This is done because there is a concern in the event of an impact on the optical cable, that the optical tape core laminate 1 will be interposed between the sheath 4 and tension member 5, so that propagation losses increase when L1 is less than 0.3 mm, and that the tension members 5 may become exposed on the outside of the sheath 4 when L2 is than 0.3 mm.

Distance L3 from the center of the rip cords 6 to the inner surface of the sheath is set to be in the range of 0.2-fold or more to 1.2-fold or less than the radius r of rip cords 6. If the distance L3 is less than 0.2-fold greater than the radius r, damage may occur to the optical tape core laminate 1 when inserting the rip cords 6 into the inner space of the forming pipe 2 and subsequently splitting the optical cable. Further, when the distance L3 exceeds radius r by more than 1.2-fold, it may become difficult to tear open the sheath 4 when subsequently dividing the optical cable.

Distances L4, L5 from the surfaces of the rip cords 6 and the seams of the divided forming pipe 2 are set to be 0.5 mm or less. This is because when the distances L4, L5 exceed 0.5 mm, the ease with which the sheath 4 can be torn open may deteriorate. Note that as a result of variation in the spacing at the seams of the forming pipe 2, the rip cords 6 may be positioned between the seams. In this case, the distances L4, L5 from the surface of rip cord 6 to the seams of the divided forming pipe 2 are both less than 0.5 mm.

Figure 6:
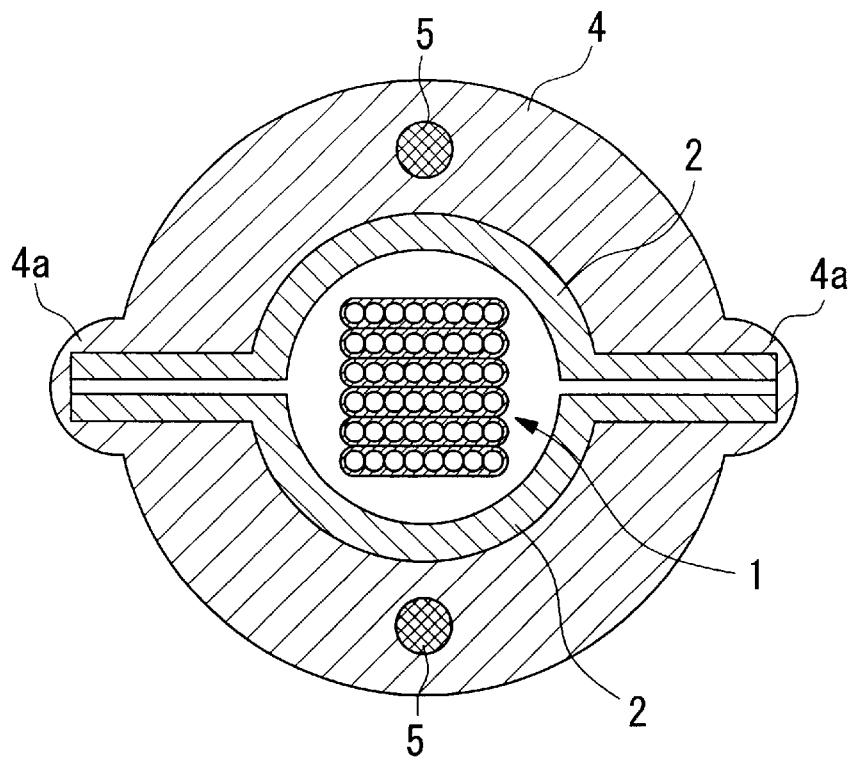
FIG. 6 is a cross-sectional view of one example of an optical cable according to the present invention.

FIG. 6 shows another example of an optical cable according to the present invention. This optical cable differs from the conventional optical cable shown in FIG. 15 in that the forming pipe 2 can be divided in half, the plurality of tapes that form the forming pipe 2 are bent in the outward direction at either end, the adhesive tape 3 and the rip cords 6 are not present, and a pair of indicators 4a for showing the position of the ends of the tapes that make up the forming pipe 2 are formed to the outer periphery of the sheath 4.

The indicator 4a forms a projection extending along the longitudinal direction of the optical cable by means of evaginating a part of the outer periphery of the sheath 4 toward the outside. The bent ends of the forming pipe 2 are inserted into this projection. Note that the indicators 4a are not limited to the form of a projection such as used in this example. Rather, they may also be formed as a groove, or may be a line-type indicator which printed, etc. to the outer periphery of the sheath 14.

In an optical cable of this design, the position of the ends of the forming pipe 2 can be easily confirmed using the indicators 4a. In addition, by cutting the indicators 4a with a cutter, and cutting the ends of the forming pipe 2 at the same time, a cut opening can be easily formed in the sheath 4, so that subsequent splitting of the optical cable can be carried out easily.

In addition, the indicators 4a form a projection that is thicker than the other parts of the sheath 4. Thus, even when inserting the ends of the forming pipe 2 are inserted into the indicators 4a, a decrease in the mechanical strength of the sheath 4 can be avoided due to the presence of the indicators 4a. As a result, this optical cable possesses excellent resistance to pressure and shocks.

Figure 7:
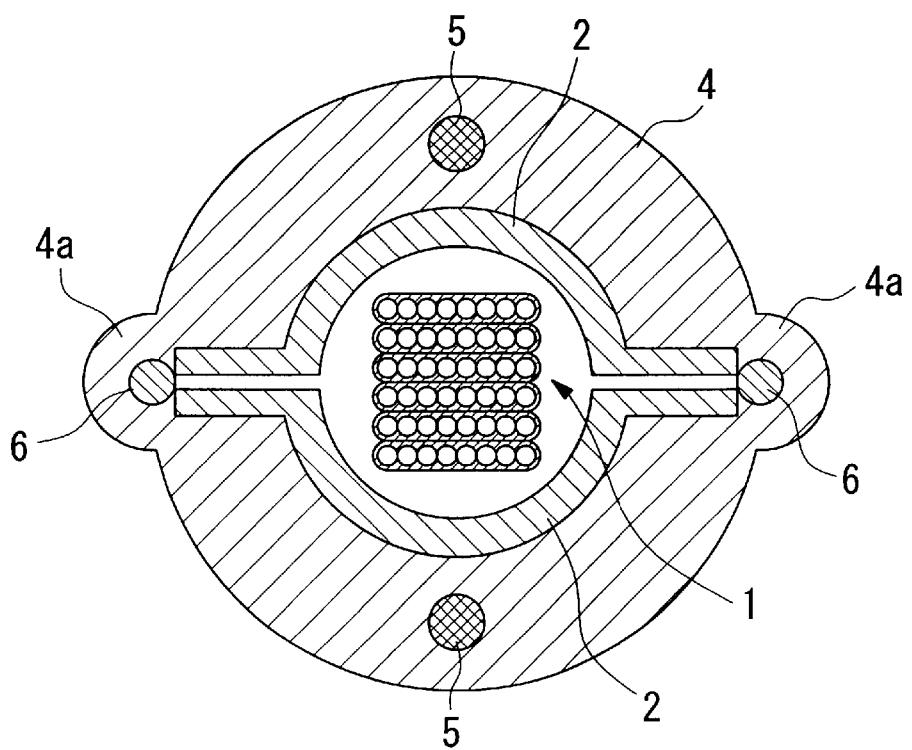
FIG. 7 is a cross-sectional view of one example of an optical cable according to the present invention.

FIG. 7 shows another example of an optical cable according to the present invention. The optical cable in this example differs from the optical cable shown in FIG. 6 in that the rip cords 6 are disposed near the seams of the forming pipe 2.

In an optical cable of this design, the position of the rip cords 6 can be easily confirmed using the indicators 4a. In addition, by splitting the indicators 4a with a tool such as a cutter or the like, rip cords 6 can be easily pulled out from the optical cable, so that subsequent splitting of the optical cable can be carried out easily.

In addition, the indicators 4a form a projection that is thicker than the other parts of the sheath 4. Thus, even when the outer diameter of the rip cords 6 is increased, a decrease in the mechanical strength of the sheath 4 can be avoided due to the presence of the indicators 4a. As a result, this optical cable possesses excellent resistance to pressure and shocks.

The manufacture of an optical cable of this design is carried out in the same manner as the manufacture of the optical cable shown in FIG. 5A.

Figure 5B:
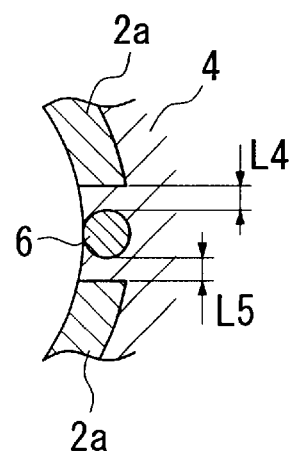
FIG. 5B is a cross-sectional view showing an enlargement of the essential components in one example of an optical cable according to the present invention.

As in the examples shown in FIGS. 6 and 7, it is also acceptable to provide an indicator to the outer periphery of the sheath 4 in the examples shown in FIGS. 5A and 5B.

The optical cables shown in FIGS. 5A through 7 are not limited to the optical tape core laminate 1 for the optical fiber housed inside the forming pipe 2. Rather, a single optical fiber tape core is also acceptable, as is an optical fiber aggregate in which a plurality of optical fiber elements are combined together.

The number of tapes comprising the forming pipe 2 is not limited to two. For example, it is also acceptable to form a cylindrical forming pipe 2 using three or more tapes, to enable division of the forming pipe 2 into three or more parts along its longitudinal direction.

The forming pipe 2 may also have a design in which a plurality of slightly narrow width, rigid tapes to which is adhered a water-absorbing resin powder like polyacrylic resin, polyvinyl alcohol resin, polyacrylamide resin, polyoxyethylene resin or the like, are employed and continuously fashioned into the shape of a cylinder. By using the forming pipe 2 having this type of water absorbency, it is not necessary to use an expensive water absorbent yarn to water-proof the optical cable. Thus, a water repellant optical cable can be fabricated at low cost.

It is not absolutely essential that the rip cords 6 be positioned near the seams of the forming pipe 2. However, when the rip cords 6 are disposed at a position separated from the seams of the forming pipe 2, dividing the forming pipe 2 becomes somewhat troublesome. Accordingly, it is practical to dispose the rip cords 6 near the seams. In other words, in a design in which the rip cords are disposed near the seams of the forming pipe, splitting of the forming pipe is carried out at the same time as splitting of the sheath using the rip cords, so that the operation can be carried out quickly.

It is acceptable to provide a spacer inside the forming pipe 2, and to set the optical fiber into this spacer groove. The spacer groove may be twisted in one direction or in the SZ directions. It is also acceptable to house a metal cable along with the optical fiber inside the forming pipe 2. In this case, optical fiber codes, or optical fiber units or the like may be used for the optical fiber. Communications wires, electric power wires, or coaxial cables may be employed as the metal cable.

The outermost layers of the optical fiber tape core laminate 1 which is housed inside the forming pipe 2 may consist of dummy tape cores. A water absorbent resin powder such as polyacrylic resin, polyvinyl alcohol resin, polyacrylamide resin, polyoxyethylene resin or the like, is adhered to the surface of the dummy tape cores.

Yarn may be employed to fill the inside of the forming pipe 2. This yarn may be a water-absorbent yarn consisting of a water absorbing fiber in which a water-absorbent resin such as polypropylene fiber, polyacrylic resin, polyvinyl alcohol resin, polyacrylamide resin, polyoxyethylene resin, etc. is formed into fibers.

A shock-absorbing material may be provided to the inner surface of the forming pipe 2, with the optical fiber being surrounded by this shock-absorbing material.

For the tape comprising forming pipe 12, it is acceptable to use an arrangement in which a polyester film consisting of polyethylene terephthalate is adhered onto a base film, a non-woven cloth consisting of a shock-absorbing material is adhered to this polyester film, and a water-absorbing powder is adhered to this non-woven cloth.

Figure 8:
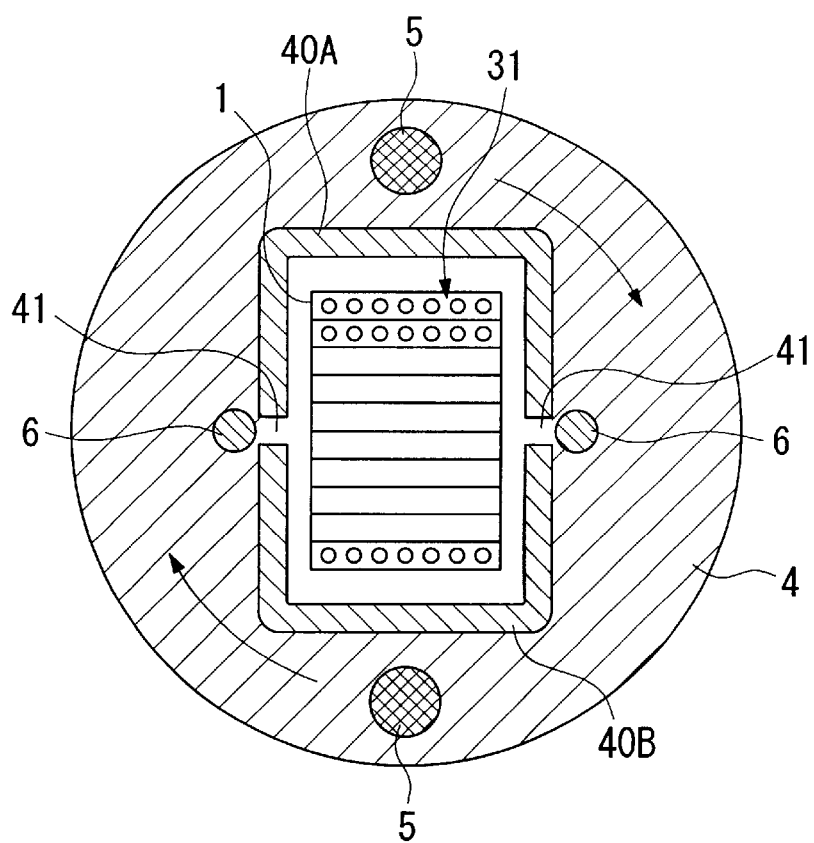
FIG. 8 is a cross-sectional view of one example of an optical cable according to the present invention.
Figure 9:
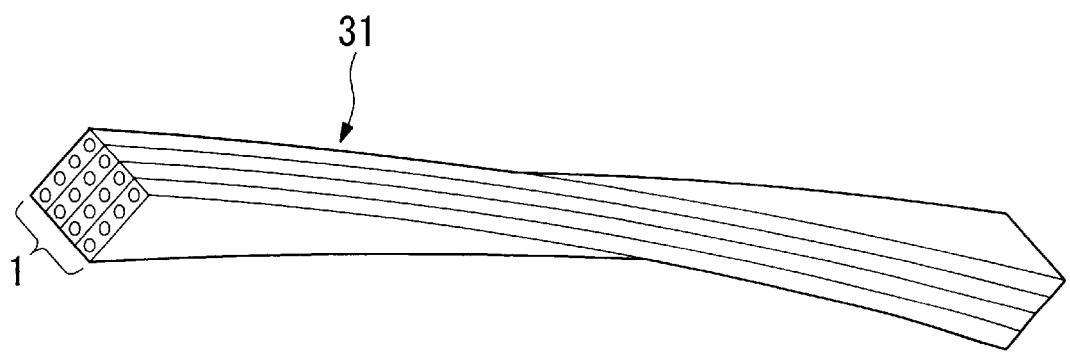
FIG. 9 is a perspective view showing an example of the cable core employed in the optical cable according to the present invention.
Figure 10:
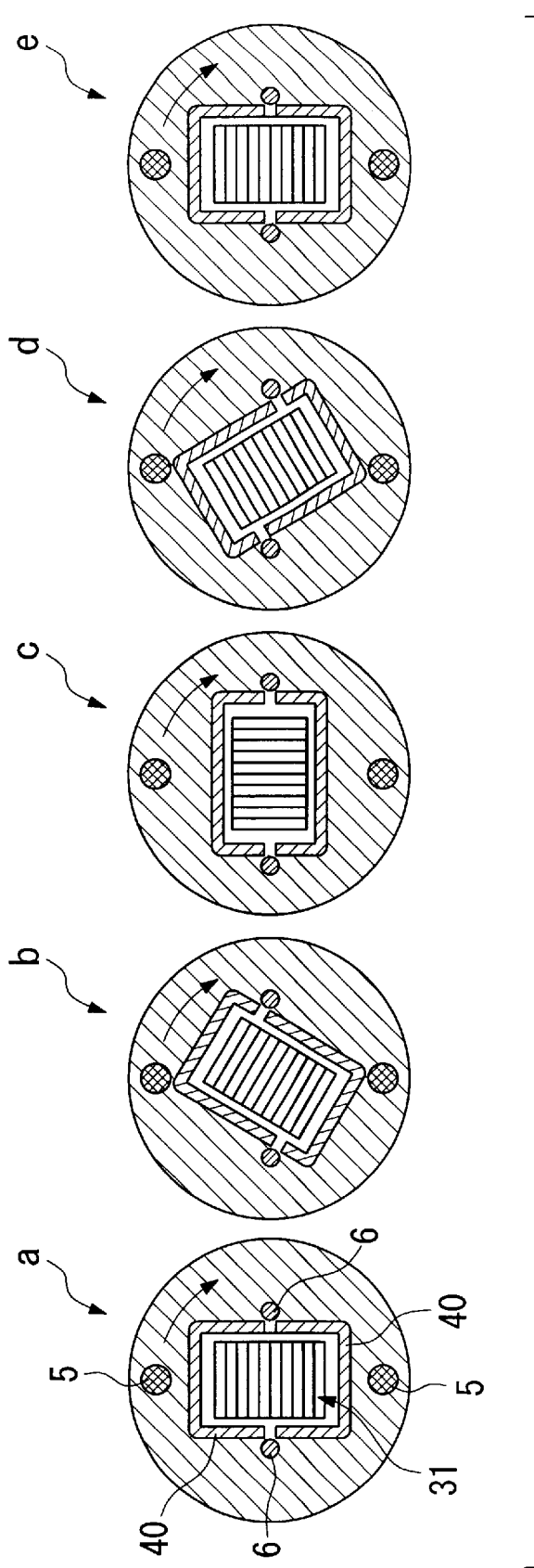
FIG. 10 is a view showing an example in cross-section of the present invention's optical cable at a different position along the longitudinal direction.

FIGS. 8 through 10 show other examples of optical cables according to the present invention. In this example, a cable core 31 is formed by twisting the optical tape core laminate 1 in one direction, or in the SZ directions by alternately reversing from the left to the right at a fixed cycle. The periphery of the cable core 31 is covered by two protective tapes 40A, 40B with a small interval of spacing present between the cable core 31 and the respective protective tapes. The two protective tapes 40A, 40B extend along the longitudinal direction of the cable core 31 and are not twisted relative to the cable core 31.

As a result, as shown in FIG. 10, (*a*)–(*e*), the cross-sectional surface of the cable core 31 rotates according to changes in the position along this longitudinal direction. On the other hand, the shape of the cross-sectional surface of the two upper and lower protective tapes 40A, 40B gradually changes in accordance with the rotation of the cross-sectional surface of the cable core 31, however the protective tapes 40A, 40B themselves do not rotate. In other words, in this optical fiber, the cable core 31 is housed in a twisted state in the center of a central opening which is rectangular in cross-section and formed by the protective tapes 40A, 40B.

A pair of rip cords 6 for tearing open the sheath 4, explained below, are disposed along the longitudinal direction of the cable core 31 near the abutting surfaces 41 at the edge of these two protective tapes 40A, 40B.

A pair of tension members 5 are disposed along the longitudinal directions of the cable core 31 slightly separated from protective tapes 40A, 40B and lateral to the surfaces of the protective tapes 40A, 40B that are roughly perpendicular to the surfaces that include the rip cords 6. The phrase "slightly separated from the protective tapes 40A, 40B" used here means a position at which the tension members 5 do not come in contact with the protective tapes 40A, 40B even when the outer peripheral edges of the protective tapes 40A, 40B are closest to the tension members 5, as shown in (b) and (d) in FIG. 10.

Figure 11:
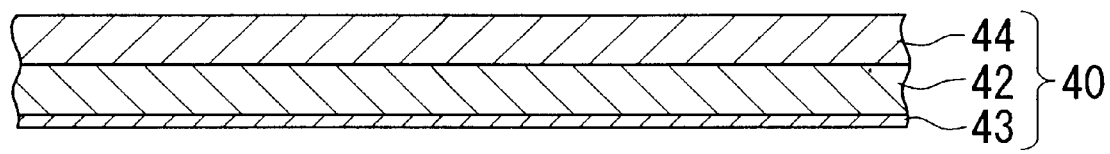
FIG. 11 is a cross-sectional view showing an example of the protective tape employed in an optical cable according to the present invention.

As shown in FIG. 11, the protective tapes 40A, 40B are composed of a three-layer structure formed in the shape of a tape and positioned at the center of the core, this three-layer structure consisting of a base 42 consisting of aluminum tape, polyester tape, or synthetic paper tape; a heat-sensitive adhesive resin layer (hot-melt coating layer) 43 provided to one surface of this base 42 consisting for example of polyethylene, EVA or saran; and a water-absorbing layer 44 provided to the other surface of the base 42 and consisting of a porous hollow fiber layer, mixed fiber cloth of polyester and nylon cloth, or a non-woven cloth. When heat fusion between the protective tapes 40A, 40B and sheath 4 is not desired, the above-described holt-melt coating layer 43 may be omitted. Furthermore, employment of the two-layer protective tape 40A, 40B is the most preferred embodiment, however, it is also acceptable to cover the entire cable core with a single wide protective tape (omitted from the figures).

An example of the method for producing the optical cable according to the present invention will now be explained.

A plurality of optical fiber tape cores are supplied to twisting dies so that they are laminated together in parallel. At the same time, the cable core 31 is formed by rotating in one direction or in the SZ directions a rotating support frame comprising bobbins around which the optical fiber tape cores are wrapped, and twisting this plurality of optical fiber tape cores. Next, twisted cable core 31 is sent out from the twisting dice, and is guided into a former used for the protective tapes 40A, 40B.

Two protective tapes 40A,40B which were relayed from above or below, or from the left or the right, with respect to the cable core 31 are formed inside the former into a V-shape extending along the longitudinal direction of the cable core 31, and are employed to cover the periphery of the cable core 31 leaving a slight interval of spacing in between.

The rip cords 6 are disposed near the abutting walls 41 at the ends of the protective tapes 40A, 40B, and the tension members 5 are disposed to the outside of the protective tapes 40A, 40B, extending in the longitudinal direction of the cable core 31. The rip cords 6 and tension members 5 are guided into an extrusion forming device and covered with the sheath 4 consisting of a plasticizing resin such as polyethylene, for example.

The cable core 31 is twisted in this optical cable, so that bending distortion is decreased even when the cable is bent. Furthermore, the rip cords 6 are disposed near the abutting surfaces 41 on the ends of the protective tapes 40A, 40B. As a result, even though the cable core 31 is twisted, the protective tapes 40A, 40B can be easily separated from the cable core 31 and the sheath 4 easily torn open when tearing open the sheath 4 by pulling the rip cords 6 from the sheath 4. In addition, the protective tapes 40A, 40B are not twisted relative to the cable core 31, so that the corners of the protective tapes 40A, 40B do not come into contact with or impede the tension members 5.

Since a spacer for forming a spiral-shaped groove is not necessary, the manufacture of the cable core 31, and thus the optical cable, becomes easier while also yielding benefits from a cost perspective. Moreover, it is not necessary to mount an optical tape core laminate 1 inside a slot, thus, distortion in the optical fiber core is reduced. As a result, a cable with excellent properties is obtained.

When the protective tapes 40A, 40B are formed using two layers, two abutting surfaces 41 are provided at the ends of the tapes. As a result, the optical fiber inside can be easily exposed by splitting the sheath 4 in two.

When providing the hot-melt coating layer 43 to the outer surface of the base 42 in the protective tapes 40A, 40B, the protective tapes 40A, 40B and sheath 4 can be adhered together using the heat of the melted resin when extruding and coating the sheath 4.

When providing the water-absorbing layer 44 to the inner surface of the base 42 in the protective tapes 40A, 40B, moisture will be absorbed by this water-absorbing layer 44 in the rare event that water leaks from a damaged area in the sheath 4 or from the end surface of the cable.

Figure 12:
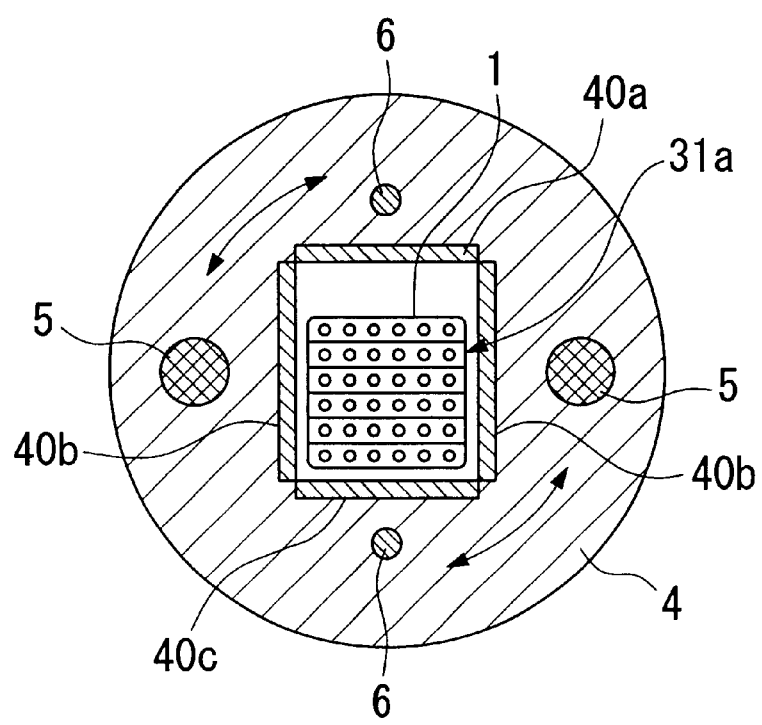
FIG. 12 is a cross-sectional view showing an example of an optical cable according to the present invention.
Figure 13:
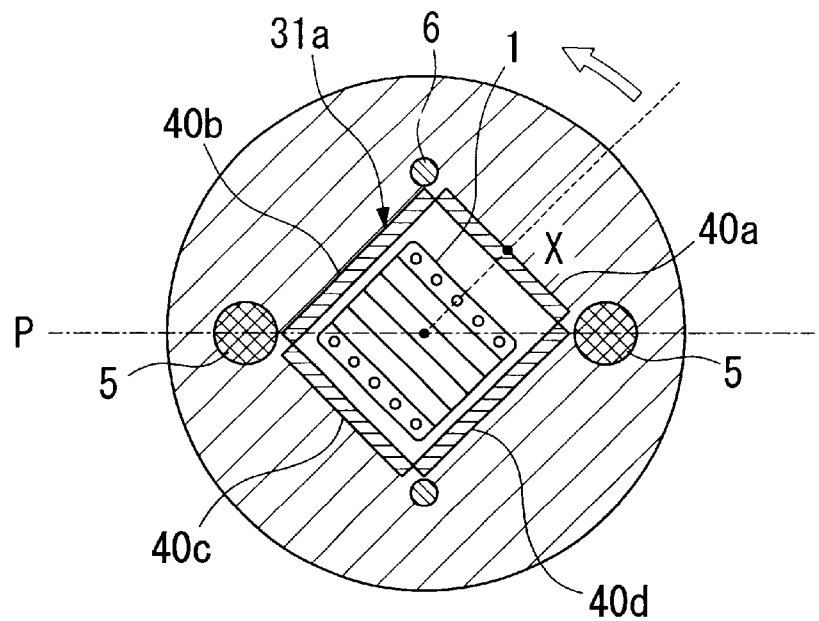
FIG. 13 is a cross-sectional view showing the position of reversal of the cable core in one direction in an optical cable according to the present invention.
Figure 14:
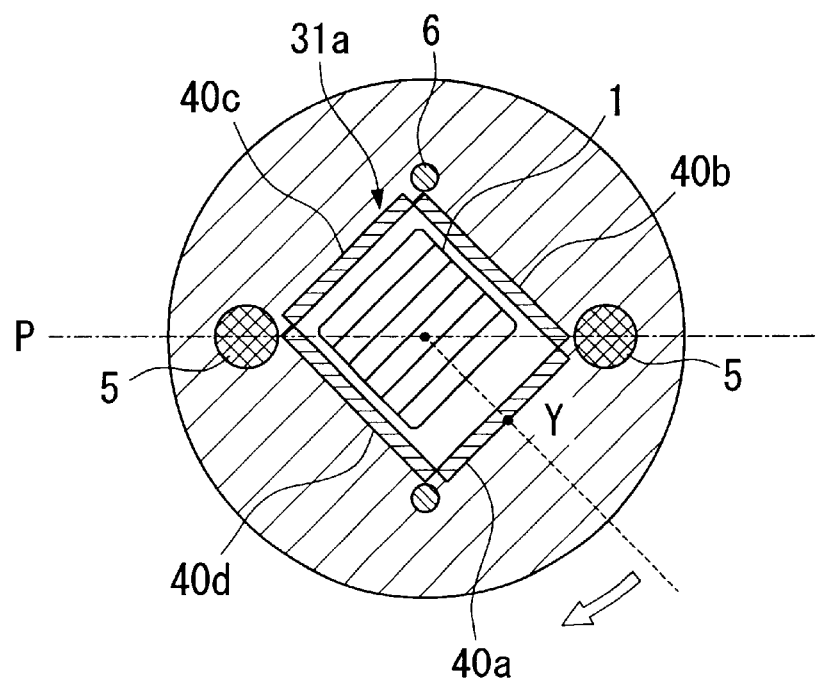
FIG. 14 is a cross-sectional view showing the position of reversal in the other direction of the cable core in an optical cable according to the present invention.

FIGS. 12 through 14 show another example of an optical cable according to the present invention. In this example, the cable core 31 is formed of the optical tape core laminate 1 and four protective tapes 40a, 40b, 40c, and 40d which surround the periphery, i.e., the top, bottom and both side surfaces, of the optical tape core laminate 1, and extend along its longitudinal direction. A small interval of spacing is formed in between the optical tape core laminate 1 and protective tapes 40a, 40b, 40c, and 40d which is useful when exposing the optical fiber core from the cable unit and splitting it.

In this example, the position of the pair of tension members 5 is roughly symmetrical about the center core of the optical cable. For this reason, the optical cable is bent along the surface that includes this pair of the tension members 5. In other words, the neutral line when the optical cable is bent becomes the surface that includes the pair of tension members 5.

As shown in FIGS. 13 and 14, the cable core 31a is twisted from the state shown in FIG. 12, so as to alternate from left twisting to right twisting, and from right twisting to left twisting, i.e., so as to reverse in the SZ directions, at a fixed cycle. In other words, in FIG. 13, once a fixed point on the cable core 31a, for example the center area of the protective tape 40a, reaches one reversing area X (for example, the area for reversing from the right to the left) which is positioned the above tension member 5, it immediately reverses, and is twisted until the other reversing area Y (for example, the area for reversing from the left to the right) which is positioned the below tension member 5 is reached The center portion of protective tape 40 begins to turn and twist from the reversing area Y toward the reversing area X.

As a result, the position of the one reversing area X and the other reversing area Y are opposite one another and positioned above and below a plane P that includes a pair of the tension members 5.

The reversing angle for the cable core 31a, i.e., the angle at which, after twisting in one direction, the cable core 31a is twisted until it twists in a different direction is optimally 275° (i.e., the direction of twisting in cable core 31a reverses every 275°). However, by designing the positions of the reversing areas X and Y to be vertically symmetrical with respect to the plane P that includes the pair of tension members 5, this optimal switching angle is not absolutely strictly set to 275°. Moreover, it is still possible to obtain an optical cable with excellent cable properties even if a sine waveform is not strictly maintained for the twisting track. As a result, there is a greater freedom of design permitted for the cable, and its manufacture is facilitated.

The position of the reversing area when twisting the cable core 31a alternately from the left to the right is determined using the position of the tension members 5 as a basis. Thus, control of switching is facilitated. In addition, the neutral line when the cable is bent becomes the surface that includes the tension member 5, and the shape of the twisting track for an SZ twist in the cable core 31a is the same on the inside and the outside of this neutral line. For this reason, bending distortion occurring in the optical fiber core due to bending of the cable is eliminated.

A spacer is not required for forming a spiral shaped groove in the surface of the cylindrical rod formed of a plastic material. Moreover, a process for producing these spiral grooves is not needed. Thus, the manufacture of the optical cable is facilitated and there are benefits from a cost perspective as well.

Since there is no mounting of a plurality of laminated optical fiber tape cores in a slot, the distortion in the optical fiber core is reduced, and excellent cable properties are obtained.

Note that the protective tape is not limited to four layers. Rather, it is also acceptable to use a design in which the upper surface and one of the side surfaces of the optical tape core laminate 1 are covered by folding over a single layer of protective tape, and then covering the optical tape core laminate 1 with two protective tapes which have V-shaped cross-section. Alternatively, a design may be employed in which one protective tape is relayed to the former, and formed into a tray which has U-shaped cross-section. Optical tape laminate 1 is then mounted in this tray, and another protective tape is disposed on top of this to serve as a lid.

It is also acceptable to employ a design such as shown in FIG. 11 for the protective tape described above. However, when it is not desirable to heat fuse the protective tape and sheath 4, then it is of course acceptable to omit the hot-melt coating layer 43 described above.

What is claimed is:

1. An optical cable comprising: optical fibers; a forming pipe for housing said optical fibers; a sheath provided around said forming pipe; a pair of tension members embedded in said sheath; and a pair of rip cords similarly embedded inside said sheath; wherein:

said forming pipe is fashioned using a plurality of tapes in such a way as to permit said forming pipe to be divided in their longitudinal direction;

said rip cords are provided near the seams of said forming pipe; and a distance from the surface of said tension members to the inner surface of said sheath and to the outer surface of said sheath are both 0.3 mm or more, and the distance from the center of said rip cords to the inner surface of said sheath is from 0.2-fold or greater to 1.2-fold or less than the radius of said rip cords, and the distance from the surface of said rip cords to the seams of said forming pipes is 0.5 mm or less.

2. An optical cable according to claim 1, wherein indicators showing the position of the ends of said plurality of tapes are formed on the outer periphery of said sheath.

3. An optical cable comprising: optical fibers; a forming pipe for housing said optical fibers; a sheath provided around said forming pipe; and a pair of rip cords similarly embedded inside said sheath; wherein, said forming pipe is fashioned using a plurality of tapes in such a way as to permit said forming pipe to be divided in their longitudinal direction, and both ends of each of said plurality of tapes are bent toward the outside.

4. An optical cable according to claim 3, wherein said rip cords are provided near the seams of said forming pipe.

5. An optical cable comprising:

a cable core formed of a plurality of optical fiber tape core laminates arrayed in the form of a ribbon, the optical tape core laminates being twisted in one direction or in SZ directions;

a protective tape covering the periphery of said cable core with a space therebetween;

a sheath provided around said protective tape;

tension members embedded in said sheath; and rip cords embedded in said sheath disposed near the seams of said protective tape, wherein said protective tape is formed of a pair of protective tape pieces and a rip cord is disposed near the seam of each of said protective tape pieces.

6. An optical cable according to claim 5 wherein said tension members are disposed at a position which is separated from said protective tape.

7. An optical cable according to claim 5, wherein said protective tape is provided with a base and a hot-melt coating layer is provided to the outer surface of this base, said hot-melt coating layer being melted onto said sheath.

8. An optical cable according to claim 7, wherein a water-absorbing layer is provided to the inner surface of said base of said protective tape.

9. An optical cable comprising:

a cable core having an optical ribbon core laminate obtained by laminating a plurality of optical fiber ribbon cores which are formed by arraying a plurality of optical fiber cores in the form of a ribbon, and a protective tape covering an outer periphery of the cable core;

a sheath provided around said cable core; and a pair of tension members embedded roughly opposite one another centered around said cable core; wherein, said cable core is twisted so as to alternately reverse from left to right at a fixed cycle, and a position at which said cable core reverses in one direction and the position at which said cable core reverses in the other direction are opposite one another and on either side of a surface which includes said pair of tension members.

10. An optical cable according to claim 9, wherein rip cords are embedded in said sheath.

* * * * *